United States Patent [19]
Brady et al.

[11] Patent Number: 5,606,703
[45] Date of Patent: Feb. 25, 1997

[54] INTERRUPT PROTOCOL SYSTEM AND METHOD USING PRIORITY-ARRANGED QUEUES OF INTERRUPT STATUS BLOCK CONTROL DATA STRUCTURES

[75] Inventors: James T. Brady; Damon W. Finney, both of San Jose, Calif.

[73] Assignee: International Business Machines Corporation, Armonk, N.Y.

[21] Appl. No.: 567,940

[22] Filed: Dec. 6, 1995

[51] Int. Cl.$^6$ .............................. G06F 9/46; G06F 13/26
[52] U.S. Cl. ........................... 395/737; 395/736; 395/868
[58] Field of Search ..................................... 395/859, 737, 395/868, 736, 726, 733, 739, 740, 826, 650, 375, 742

[56] References Cited

U.S. PATENT DOCUMENTS

| | | | |
|---|---|---|---|
| 4,271,468 | 6/1981 | Christensen et al. | 395/859 |
| 4,488,227 | 12/1984 | Miu et al. | 395/375 |
| 4,636,944 | 1/1987 | Hodge | 395/737 |
| 4,689,739 | 8/1987 | Federico et al. | 395/737 |
| 4,761,732 | 8/1988 | Eldumiati et al. | 395/736 |
| 4,980,820 | 12/1990 | Youngblood | 395/826 |
| 4,980,824 | 12/1990 | Tulpule et al. | 395/650 |
| 5,095,526 | 3/1992 | Baum | 395/740 |
| 5,155,853 | 10/1992 | Mitsuhira et al. | 395/734 |
| 5,261,107 | 11/1993 | Klim et al. | 395/739 |
| 5,274,823 | 12/1993 | Brenner et al. | 395/726 |
| 5,313,640 | 5/1994 | Beardsley et al. | 395/733 |
| 5,319,753 | 6/1994 | MacKenna et al. | 395/868 |
| 5,325,536 | 6/1994 | Chang et al. | 395/736 |

OTHER PUBLICATIONS

IBM Technical Disclosure Bulletin—vol. 15, No. 1, Jun. 1972—'Processor Interrupt Buffer Mechanism'—P. D. Dodd, G. Lebizay and A. H. Rall (pp. 104–105).

IBM Technical Disclosure Bulletin—vol. 17, No. 7, Dec. 1974—'Intelligent Input/Output Interrupt Processing'—T. R. Edel (pp. 1915–1916).

Primary Examiner—Gopal C. Ray
Attorney, Agent, or Firm—Ohlandt, Greeley, Ruggiero & Perle

[57] ABSTRACT

A data processing system includes a software interrupt handler which controls performance of interrupt actions. The system further includes plural subsystems, each subsystem manifesting an interrupt request upon occurrence of an associated event. Hardware is provided which responds to an interrupt request by issuing an order to construct an interrupt status block (ISB) control data structure with a determined priority ranking. A controller is responsive to the issued order and constructs the ISB data structure. The ISB at least includes a pointer value indicating a next ISB having a same priority ranking, interrupt data identifying an interrupt procedure to be used by the software interrupt handler and information indicating a source of the interrupt request. The controller arranges the ISB in a queue of ISB's having a same determined priority and signals the software interrupt handler to commence performance of an interrupt action only if the order issued by the hardware requires an immediate interrupt. In such case, the software interrupt handler responds by reading contents of the ISB and performing operations in accordance with that data. Otherwise, normal processing resumes. Under normal circumstances, the controller, in executing an interrupt, is not required to inquire of the subsystem which manifested the interrupt request.

11 Claims, 3 Drawing Sheets

INTERRUPT PROTOCOL SYSTEM AND METHOD USING PRIORITY-ARRANGED QUEUES OF INTERRUPT STATUS BLOCK CONTROL DATA STRUCTURES

FIELD OF THE INVENTION

This invention is related to performance of interrupt actions in high-performance data processing systems and, more particularly, to a method and apparatus for handling an interrupt wherein all data required to enable execution of the interrupt is contained in a control block data structure which is listed in one of a plurality of priority-arranged interrupt queues.

BACKGROUND OF THE INVENTION

Handling of interrupt actions in an interrupt-driven real time data processing system can significantly affect the system's performance characteristics. Software must interrogate various hardware subsystems to first determine the cause of the interrupt and then gather information from the interrupt source hardware subsystem to determine what action or actions to take. When several interrupts exhibit the same interrupt priority level, the task of determining which interrupt source to handle first, while also making sure that no interrupt remains pending for an excessively long time, may add considerable processing overhead to the software code which controls performance of tile interrupt action.

In a typical prioritized interrupt system, various events can occur which give rise to an interrupt. Interrupt signals (i.e., "requests") arising from such events are assigned predetermined priority levels, ranging from high priority to relatively low priority. A high priority interrupt request can interrupt regular processing as well as the processing of a low priority interrupt request. Conversely, an interrupt request of low priority can interrupt regular processing, but cannot interrupt the processing of an interrupt request of equal or higher priority.

A commonly utilized interrupt processing method causes interrupt requests to be queued and then executed on a one-by-one basis, until all interrupts in the queue have been exhausted. The processor, upon accessing an interrupt request from the queue, polls a plurality of connected subsystems to determine which subsystem initiated the interrupt request and then determines from that subsystem, the necessary facts to enable execution of the requested interrupt action. This action is time-consuming and exacts a high processing overhead for tile performance of interrupts.

The prior art is replete with teachings of interrupt handling methods and systems. Dodd et al. in "Processor Interrupt Buffer Mechanism" IBM Technical Disclosure Bulletin, Vol. 15, No. 1, June 1972, pp. 104–105, describes a system wherein interrupts are listed in a variable-length queue in a local storage address space of an associated processor. Interrupts are stored in the queue in a first-in, first-out sequence. In a similar vein, Eden in "Intelligent Input/Output Interrupt Processing" IBM Technical Disclosure Bulletin, Vol. 17, No. 7, December 1974, pp. 1915–1916, describes a listing of interrupt requests in a queue stack. Eden further describes the subsequent processing of the interrupt requests at a later, more desirable point in time. Eden also indicates that the stacked interrupt requests can be subsequently processed in an order which is different from the physical sequence in which they were received.

Youngblood (U.S. Pat. No. 4,980,820) describes an interrupt-driven data processor wherein an interrupt handler identifies and queues individual work items that must be performed to completely satisfy a received interrupt request. The interrupt request is not necessarily performed immediately and can be performed at a future time without affecting processor performance. By having the work items required for the interrupt action in a queue, the processor operation is interrupted for a minimum amount of time while servicing the interrupt request. Further, the work items in the queue are prioritized for execution.

Beardsley et al. (5,313,640) describes a system for responding to multiple different types of interrupts. A selected type of interrupt, for a next interrupt to be received by a storage subsystem controller, is then determined in response to a determination of the current state of the controller. A particular state associated with the occurrence of the selected type of interrupt is then determined. Reversible processing, associated with the particular state, is then initiated prior to receipt of the next interrupt.

Chang et al., in U.S. Pat. No. 5,325,536, describe an interrupt handling system which includes a plurality of interrupt queues. Each queue is pre-established and holds a predetermined number of interrupt pointers, all of which indicate interrupt actions that are to be handled by one of a plurality of interrupt handlers. Each interrupt handler is a separate routine for carrying out a predefined process corresponding to a particular group of events. Thus, all events giving rise to an interrupt listed in one queue are handled by one sub-routine call to an associated interrupt handler. In other words, when the interrupt pointers listed in a queue are called for execution, only a single entry into the associated interrupt handler routine is required to enable all interrupt requests in the queue to be executed.

During operation of a data processing system, a number of events may occur which will eventually require the execution of an interrupt, but where the exact time of execution of the interrupt is not critical. When, however, that interrupt is eventually executed, it is desirable to reduce, by as much as possible, the processing overhead required to execute the interrupt.

Accordingly, it is an object of this invention to provide an improved method and apparatus for handling interrupt actions wherein data processing overhead required to enable interrupt execution is minimized.

It is another object of this invention to provide an improved method and apparatus for handling of interrupts which enables non-time critical interrupts to be enqueued and to be executed at a later time.

It is yet another object of this invention to provide an improved method and apparatus for handling of interrupts wherein an indefinite-length queue of interrupt requests can be dynamically constructed and subsequently executed in a manner so as to minimize processing overhead.

SUMMARY OF THE INVENTION

A data processing system includes a software interrupt handler which controls performance of interrupt actions. The system further includes plural subsystems, each subsystem manifesting an interrupt request upon occurrence of an associated event. Hardware is provided which responds to an interrupt request by issuing an order to construct an interrupt status block (ISB) control data structure with a determined priority ranking. A controller is responsive to the issued order and constructs the ISB data structure. The ISB at least includes a pointer value indicating a next ISB having a same priority ranking, interrupt data identifying an interrupt procedure to be used by the software interrupt handler and information indicating a source of the interrupt request. The controller arranges the ISB in a queue of ISB's having a same determined priority and signals the software interrupt handler to commence performance of an interrupt action only if the order issued by the hardware requires an immediate interrupt. In such case, the software interrupt handler responds by reading contents of the ISB and performing operations in accordance with that data. Otherwise, normal processing resumes. Under normal circumstances, the controller, in executing an interrupt, is not required to inquire of the subsystem which manifested the interrupt request.

DETAILED DESCRIPTION OF THE INVENTION

Figure 1:
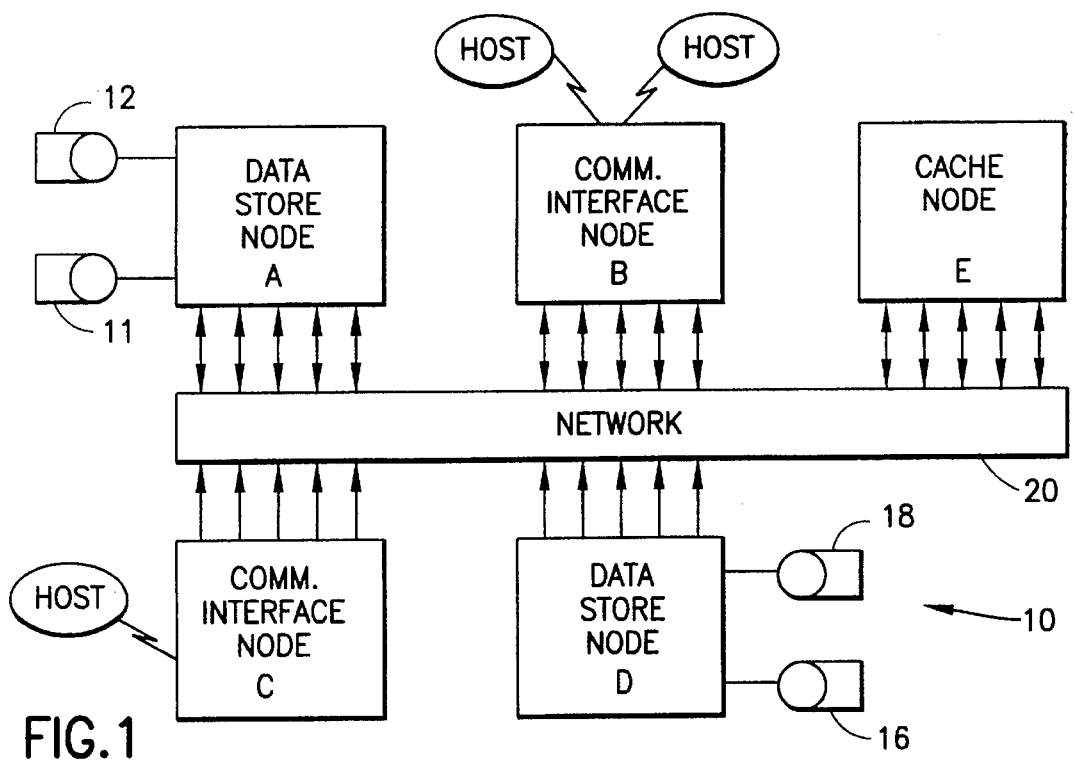
FIG. 1 is a block diagram illustrating a multi-node data processing array.

The block diagram of FIG. 1 illustrates a multi-node network 10 which implements the interrupt protocol to be described below. Nodes A and D are data storage nodes that connect to coupled disk drives 12, 14 and 16, 18 respectively. A pair of communication interface nodes B and C provide input/output functions to coupled host processors which make use of the data storage facilities of the multi-node network. A cache node E provides temporary storage facilities for both input and output data transfer functions between network 10 and one or more of the host processors. Multi-node network 10 is expandable by addition of further nodes, all of which are interconnected by an internal communication network 20.

Figure 2:
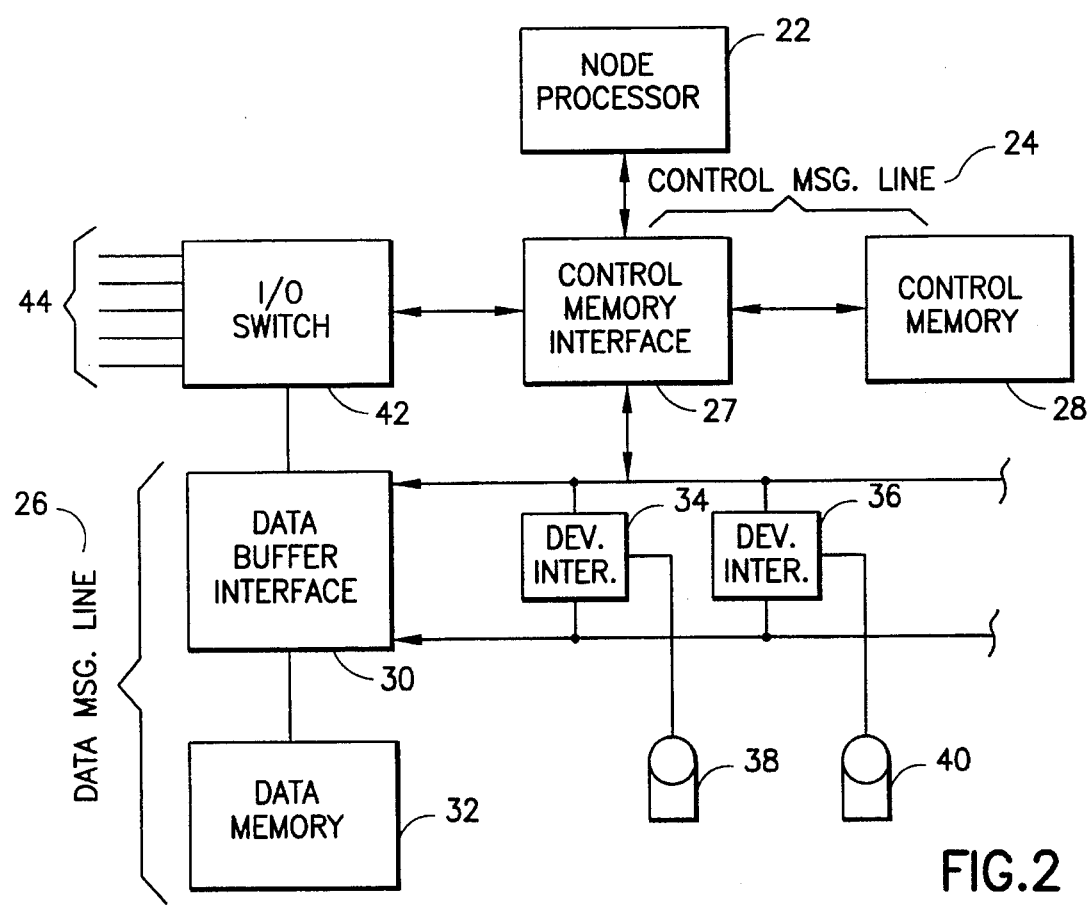
FIG. 2 is a block diagram of components of an exemplary node employed in the system of FIG. 1.

Each of the nodes in FIG. 1 is configured from a common node arrangement shown in FIG. 2 and includes a node processor 22 that controls the overall functions of the node. Each node further includes a control message "line" 24 for receiving, storing and dispatching control messages and a data message "line" 26 for receiving, storing and dispatching data messages. Within control message line 24 is further apparatus for responding to and executing interrupt actions in accordance with the invention to be described below.

Control message line 24 comprises a control memory interface module 27 and a control memory 28. Data message line 26 includes a data buffer interface module 30 and a data memory 32 for data messages. Data buffer interface module 30 connects to a plurality of device interfaces 34, 36, etc. which, in turn, provide communication to associated disk drives 38, 40, etc. Control messages originating from control memory interface 24, processor 22, etc. enable control of various node actions.

Within each node, respective control and data message lines enable segregation of control and data messages and allow their independent processing and transfer to an input/output (I/O) switch 42. I/O switch 42 includes apparatus which enables independent switching of messages that arrive on one or more of input links 44. Each of links 44 is connected to another node, thereby enabling messages to be either directly routed to a connected node or to be routed through a connected node to another node.

There are many events which can occur in data processing system 10 which can trigger an interrupt action. Some event-related interrupts require immediate handling (e.g. a hardware failure), while others can be handled at a later time (e.g. interrupt actions evidencing a low priority). Apparatus within control memory interface module 27 is provided to implement the interrupt handling actions of the invention.

Figure 3:
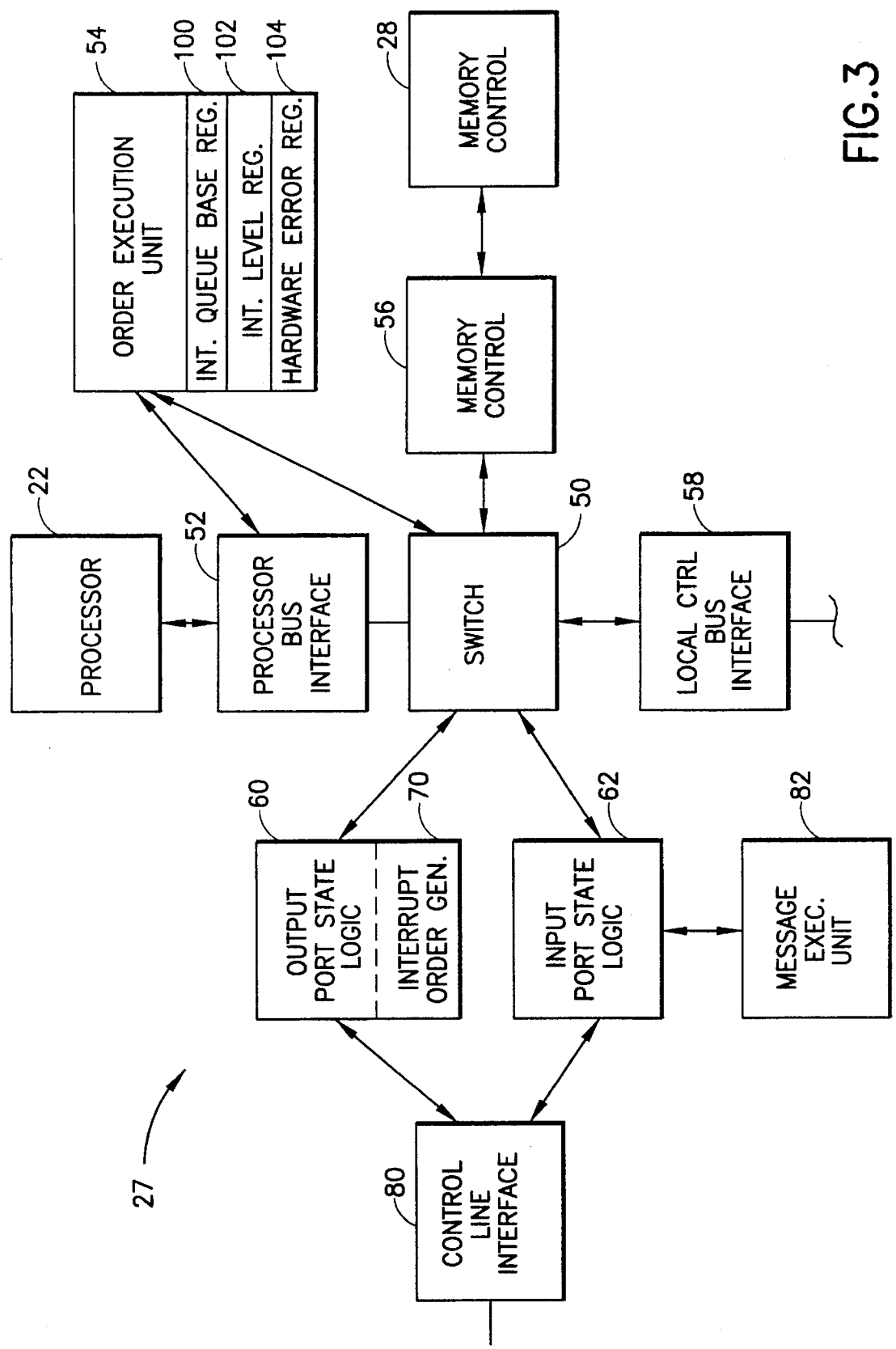
FIG. 3 is a block diagram of the control memory interface block contained in the node of FIG. 2.

The overall structure of control memory interface module 27 is shown in FIG. 3. A switch 50 provides communication links between various of the functionalities within module 27. These functionalities are a processor bus interface 52, an order execution unit 54, a memory control 56, a local control bus interface 58, an output port state logic module 60 and an input port state logic module 62. Memory control 56 enables attachment of control memory 28 via an operand memory bus 64.

Processor bus interface 52 is an interface to node processor 22 and provides a path that enables memory fetches and stores. Order execution unit 54 interprets, fetches and stores data to certain memory registers as orders to be executed. Some, but not all orders, are executed in this unit and enable expedited handling of orders without specific involvement of node processor 22. Local control bus interface 58 enables access between node processor 22 and data buffer interface 30 (FIG. 2) and the various device interfaces 34, 36 . . . that are connected to data buffer interface 30.

Output port state logic module 60 includes plurality of ready queues wherein messages of various levels of priority are queued, awaiting transmission. An input port state logic module 62 receives control messages from a control line interface module 80 and briefly buffers them. Therein, the control messages are decoded according to class (i.e. hardware/processor executed) and hardware executed messages are forwarded to message execution unit 82 where they are executed. Processor executed messages are received into memory addresses within control memory 28.

As will be hereafter understood, a first class of events can occur which cause the generation of an interrupt request, followed by an immediate execution of the interrupt. Further, a second class of events can occur which cause the generation of an interrupt request which is not immediately followed by execution of an interrupt. System 10 accommodates such events by enabling the generation of one of two orders. The first order causes addition of an ISB control data structure to an interrupt queue without an immediately following interrupt, while the second order both adds the ISB to the interrupt queue and triggers an immediate interrupt action. The initial order is: "Add ISB to Queue" and the second order is: "Add ISB to Queue and Interrupt". Note that both orders require generation of an ISB, the queuing of the ISB on a proper priority interrupt queue, followed by either performance of an interrupt action or a return to normal processing. In the former case, the ISB is added to an interrupt queue of the same priority and awaits execution until an ISB requiring an immediate interrupt is added to that interrupt queue. In such case, all ISB's present on the respective priority queue are executed, starting with the first ISB present on the queue.

A control block data structure is a compilation of data which, when accessed, enables an operating procedure to complete, utilizing data from the control block. An ISB is a control block which contains sufficient data to enable an interrupt action to proceed to completion without requiring reference to the subsystem which caused issuance of the interrupt request.

Many classes of events can occur which cause the signalling of an interrupt: internal node hardware errors; an illegal order; an input/output port error; a time-of-day clock interrupt; etc. Each subsystem, which may detect an event that requires either an immediate or a delayed execution of an interrupt action, is provided with hardware logic that is responsive to the occurrence of the event to generate one of the two aforementioned orders, depending upon whether an immediate or delayed interrupt action is required. For example, output port state logic module 60 includes an interrupt order generator 70 which, upon sensing a port disconnect, generates an Add ISB to Queue order. That order is transmitted via switch 50 to order execution unit 54.

Note that while interrupt order generator 70 is shown associated with output port state logic module 60, there is similar interrupt generator hardware associated with each of the other subsystems that are subject to an event or events which require the initiation (at some time) of an interrupt. Thus, the interrupt order generation process is distributed throughout the system and is hardware actuated.

Order execution unit 54 employs data residing in a plurality of hardware registers 100, 102 and 104 during the handling of a received interrupt order. Such data enables generation of an ISB and addition of the ISB to a proper interrupt queue in control memory 56. Within order execution unit 54, interrupt queue base register 100 includes a pointer to an address in control memory 28 wherein resides a table of pointers which defines the interrupt queues. In this example, it will be assumed that there are 8 priority levels of interrupt and that each queue has a first entry pointer and a last entry pointer.

Figure 4:
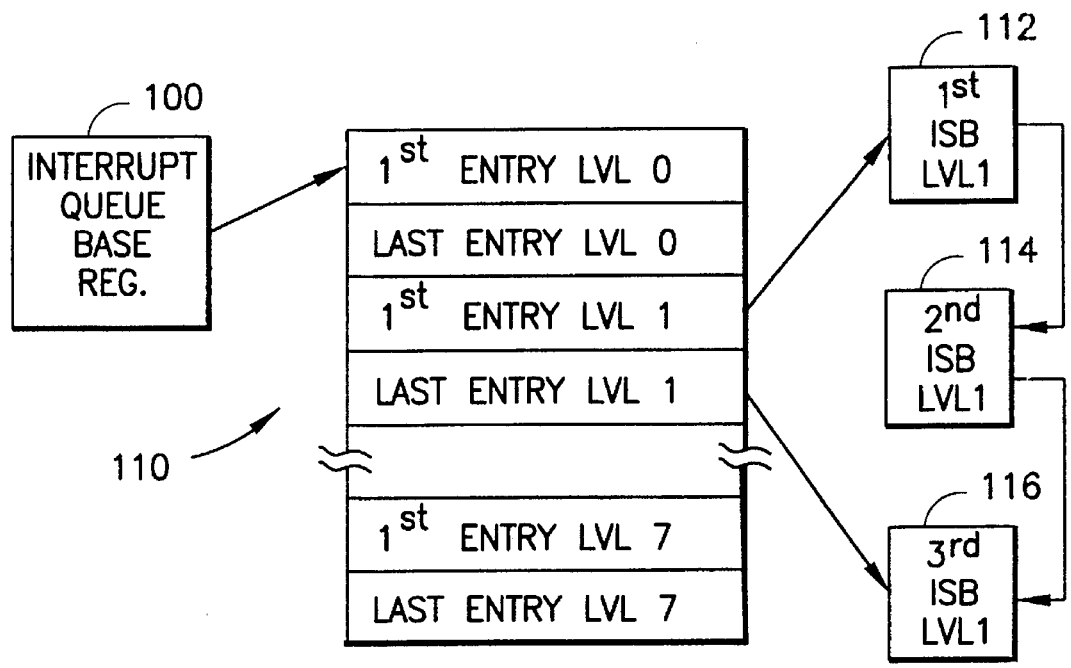
FIG. 4 is a schematic of an interrupt queue pointer table maintained by the control memory interface block.

As shown in FIG. 4, interrupt queue base register 100 points to the first address in interrupt queue pointer table 110 of the level 0 priority interrupt queue. Table 110 includes an entry for the first and last entries of each priority level interrupt queue. As is there indicated, the first entry for the priority level 1 interrupt queue is a pointer to a first ISB 112 which, in turn, includes a pointer to a second ISB 114 which, in turn, contains a pointer to a third and last ISB 116. ISB's 112, 114 and 116 comprise the level 1 priority interrupt queue. In a similar vein, other priority levels include similar pointers to ISB's enqueued thereon (not shown).

Returning to order execution unit 54, there are a plurality interrupt level registers 102, each register associated with a particular interrupt type, each containing the interrupt level that will be used whenever an interrupt is generated of the interrupt type. The further set of hardware error registers 104 includes bits which are set at a first occurrence of a hardware error and remain active until reset by the software. An occurrence of a hardware error generally results in the generation of an Add ISB to Queue and Interrupt order.

Figure 5:
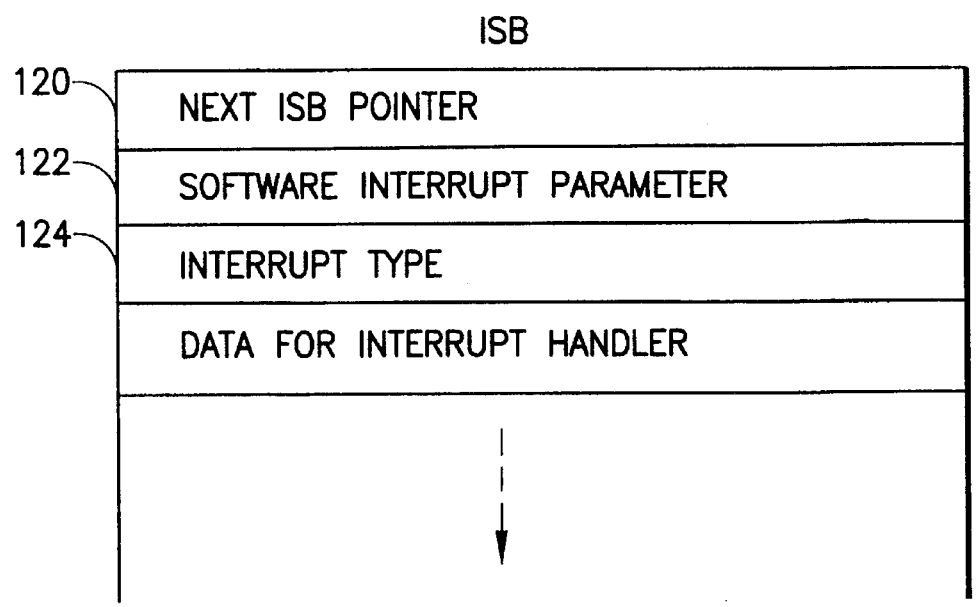
FIG. 5 is a diagram showing the structure of an interrupt status block.

FIG. 5 illustrates the contents of an ISB. An ISB is generated by a hardware action which fills fields therein with appropriate data for the specific interrupt type. While the format of an ISB depends upon the interrupt type, all ISB's have a common set of data. That data includes a "next ISB" pointer 120, a software interrupt parameter 122, and an interrupt-type entry 124. "Next ISB" pointer 120 is used by the hardware to maintain a linked list in an interrupt queue. "Next ISB" pointer 120 is initially set to 0 when it is added to an interrupt queue (as it is added at the end of the queue). When a next ISB is added to the same queue, Next ISB pointer 120 in the previously added ISB is updated to point to the address of the just added ISB in the queue.

Software interrupt parameter 122 stores a vector that is used by an interrupt handler procedure (within the operating system of the node) to branch directly to an appropriate subroutine for execution of the interrupt action. Interrupt type entry 124 defines the type of interrupt that generated the ISB and is used to determine the format of the ISB. It further identifies the source of the order which caused the generation of the ISB.

A further set of fields 126 include data which is used by the interrupt handler subroutine during execution of the interrupt action. The data within field 126 are sufficient to enable completion of the interrupt action without requiring the interrupt handler to reference the initiating subsystem for additional data. Thus, by simply accessing data within an ISB, the interrupt handler can complete an interrupt action, without further reference to the initiating subsystem. Only when there is an unsuccessful completion of the interrupt action might the interrupt handler subroutine be required to interrogate the interrupt initiating subsystem.

The operation of the invention commences when an operating subsystem detects an occurrence of an event calling for either an immediate or a delayed execution of an interrupt action. Assume initially, that output port state logic 60 (FIG. 3) detects an event allowing a delayed interrupt action. As a result, interrupt order generator 70 issues an "Add ISB to Queue" order which is then transmitted to order execution unit 54. In response, order execution unit 54 interrogates interrupt level registers 102 to determine the priority level of the received interrupt order. Further, order execution unit 54 interrogates interrupt queue base register 90 to determine the pointer to the start of interrupt queue pointer table 110 (FIG. 4) in control memory 28. Using this pointer, order execution unit 54 first assembles a new ISB by inserting therein the necessary data to enable the interrupt handler procedure to execute the interrupt action without requiring further reference to the initiating subsystem (i.e., output port state logic module 60). Upon completion of the new ISB, order execution unit 54 appends the new ISB to an interrupt queue having a priority value equal to that found in an associated interrupt level register 102. Such an enqueueing is accomplished by altering the "next ISB" pointer 120 in the last ISB in the same priority level interrupt queue, to point to the address of the newly added ISB.

Since the "Add ISB to Queue" order does not require an immediate interrupt, the procedure is then at an end. Thus, no interrupt action is commenced and the new ISB merely remains enqueued in the proper priority level interrupt queue. At some time later, when an "Add ISB to Queue and Interrupt" order is received by order execution unit 54, a similar construction of an ISB occurs, followed by addition of the ISB to the appropriate priority level interrupt queue. Assuming that the latest ISB is appended to the same priority level interrupt queue as the aforedescribed ISB, order execution unit 54 signals the interrupt handler to execute an immediate interrupt action. In response, the interrupt handler procedure proceeds to the "top" of the interrupt queue having the same priority as the just entered ISB and commences execution of each ISB queued thereon.

The interrupt handler accesses the first ISB on the respective interrupt queue and examines its software interrupt parameter 122. That parameter is a vector which enables the interrupt handler procedure to branch immediately to an appropriate subroutine to execute the required interrupt. The accessed interrupt handler subroutine then examines data field 126 for all data required to execute the interrupt action and utilizes that data to execute the interrupt. Upon completion of the interrupt action for the first ISB on the queue, the interrupt handler subroutine issues an Order which uses the "next ISB" pointer 120 to obtain the next ISB enqueued on the identified level priority interrupt queue.

The above-described procedure repeats until all ISB's on the specific priority level interrupt queue have been executed. Note that all ISB's on that priority level interrupt queue are of the same priority and are executed in an earliest received to latest received order. It is to be understood, however, that an if an interrupt action order occurs which exhibits a higher priority, interrupt actions on a lower priority queue are delayed until the higher priority interrupt action is complete.

The above described invention provides a number of benefits to an interrupt handling system. First, each priority interrupt queue is of variable length and can list as few or as many ISB's as are necessary. Second, the invention enables an enqueueing of plural ISB's, each of which requires an interrupt, without actually causing an interrupt. This action provides the flexibility of allowing plural interrupts of a common priority to be handled in a batch (assuming no higher priority interrupts occur) and avoids the need for multiple accesses to the interrupt handler sub-routine. Third, the invention enables each interrupt action to be controlled by the data in the enqueued ISB and for interrupt processing to proceed without requiring the interrupt handler procedure to either poll the sub-systems or to access a sub-system which initiated the interrupt order. The combined benefits arising from the invention enable a substantial improvement in execution time of interrupt actions in the data processing system.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A data processing system comprising:

software means for controlling performance of an interrupt action;

plural subsystems, each including means for manifesting occurrence of a related event;

hardware means responsive to said manifesting for issuing an order to construct an Interrupt Status Block (ISB) data structure having a determined priority ranking among a plurality of priority rankings;

control means, responsive to said order, for
    (i) constructing an ISB data structure which at least includes a pointer value indicating a next ISB having a same priority ranking, interrupt data identifying an interrupt procedure to be used by said software means, and information indicating a source of said manifesting;
    (ii) arranging said ISB data structure in a queue of ISB's having a same determined priority; and
    (iii) signalling said software means to commence performance of an interrupt action only if said order requires such action, said software means responding by reading contents of said ISB data structure and performing operations in accordance with data contained therein.

2. The data processing system as recited in claim 1, wherein an order may or may not require execution of an interrupt action immediately upon constructing of said ISB, and if said order does not require said execution, said software means does not cause an interrupt action upon said constructing of said ISB.

3. The data processing system as recited in claim 2, wherein said software means responds to an order requiring execution of an interrupt action upon construction of an ISB having a determined priority ranking, by executing an interrupt action for all ISB's in said queue of said determined ranking.

4. The data processing system as recited in claim 3, wherein each ISB added to a queue of determined priority ISB's is added at an end of said queue, said software means executing interrupt actions starting with an ISB positioned at a beginning of said queue and continuing through said ISB at said end of said queue.

5. The data processing system as recited in claim 1, wherein said control means further includes in each ISB, reference data required in execution of said interrupt procedure by said software means, said reference data enabling execution of an interrupt procedure without requiring an inquiry to a subsystem which manifested occurrence of an event that gave rise to the ISB.

6. A method for performing interrupt actions in a data processing system which includes software means for controlling performance of an interrupt action and plural subsystems, each subsystem including means for manifesting occurrence of a related event, said method comprising the steps of:

a. responding to said manifesting by issuing an order to construct an Interrupt Status Block (ISB) data structure having a determined priority ranking among a plurality of priority rankings;

b. constructing said ISB data structure to at least include a pointer value indicating a next ISB having a same priority ranking, interrupt data identifying an interrupt procedure to be used by said software means, and information indicating a source of said manifesting;

c. arranging said ISB data structure in an interrupt queue of ISB's having a same determined priority;

d. signalling said software means to commence performance of an interrupt action only if said order requires such action; and e. causing said software means to read contents of said ISB data structure and to perform operations in accordance with data contained therein.

7. The method as recited in claim 6, wherein an order may or may not require execution of an interrupt action immediately upon constructing of said ISB.

8. The method as recited in claim 7, further comprising the step of:

f. causing said software means to respond to an order requiring execution of an interrupt action upon construction of an ISB having a determined priority ranking, by executing an interrupt action for all ISB's in said interrupt queue of said determined ranking.

9. The method as recited in claim 8, wherein said arranging step (c) causes each ISB added to a queue of determined priority ISB's to be added at an end of said interrupt queue, and in step (f), said software means executes interrupt actions starting with an ISB positioned at a beginning of said interrupt queue and continuing through said ISB at said end of said interrupt queue.

10. The method as recited in claim 6, wherein said responding step (a) causes to be included in each ISB, reference data required in execution of said interrupt procedure, said reference data enabling execution of an interrupt procedure without requiring an inquiry to a subsystem which manifested occurrence of an event that gave rise to the ISB.

11. The method as recited in claim 6, wherein said arranging step (c) is enabled to create an interrupt queue having a variable number of enqueued ISB's.

* * * * *